April 26, 1966 M. D. BARNUM 3,247,564
CLAMPS FOR CYLINDRICAL ARTICLES
Filed April 24, 1964

MAYSON D. BARNUM
*INVENTORS.*
BY
BUCKHORN, BLORE, KLARQUIST & SPARKMAN
*ATTORNEYS*

United States Patent Office 3,247,564
Patented Apr. 26, 1966

3,247,564
CLAMPS FOR CYLINDRICAL ARTICLES
Mayson D. Barnum, 3400 Franklin Blvd., Eugene, Oreg.
Filed Apr. 24, 1964, Ser. No. 362,233
8 Claims. (Cl. 24—263)

This invention relates to an article clamp, and more particularly to a clamp for cylindrical articles.

In many instances it is necessary to clamp articles, such as, for example, welding gas cylinders, rigidly in position and to also quickly release the articles from the clamped conditions thereof. The prior art has not provided simple, strong, effective, quick clamping and quick releasing clamps.

An object of the invention is to provide a new and improved article clamp.

Another object of the invention is to provide a new and improved clamp for a cylindrical article.

A further object of the invention is to provide a simple, strong, quick clamping and quick releasing article clamp.

Yet another object of the invention is to provide an article clamp including a retaining member engaging an article and slidable along a wedging bracket to lock the article against the bracket.

A still further object of the invention is to provide an article clamp having a bracket including a pair of spaced, article-engaging portions and a ring looped over the article and slidable along a wedge portion of the bracket to hold the articles against the article-engaging portions.

The invention provides an article clamp having a bracket adapted to engage an article at two spaced points and to wedge a clamping member engaging the article in a direction pressing the article against the bracket. Preferably the bracket is in the form of a wedge which is angular in transverse cross section and has spaced, parallel edges, and the clamping member preferably is in the form of a ring adapted to encompass the article and the bracket and to move along the wedge-like bracket to press the article against the spaced, parallel edges to rigidly clamp the article.

A complete understanding of the invention may be obtained from the following detailed description of an article clamp forming a specific embodiment thereof, when read in conjunction with the appended drawings, in which.

Figure 1:
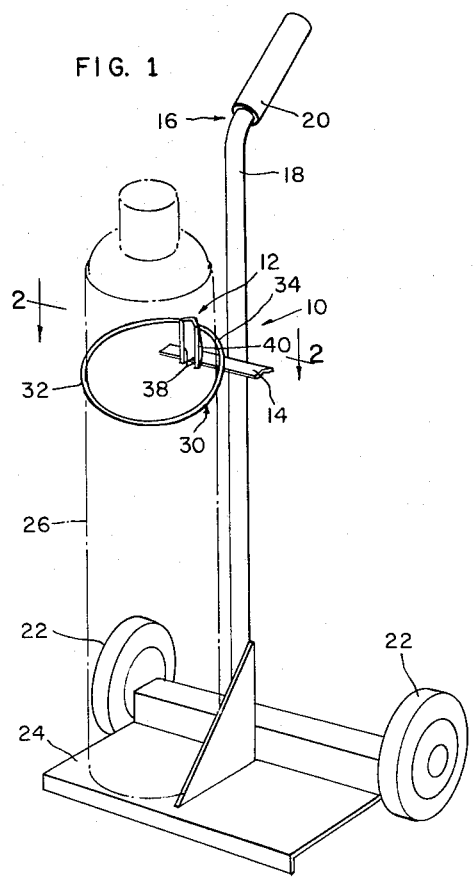
FIG. 1 is a fragmentary, perspective view of an article clamp forming one embodiment of the invention in use with a truck or dolly for transporting a welding gas cylinder.
Figure 2:
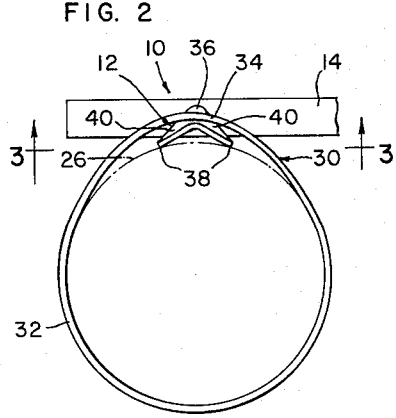
FIG. 2 is an enlarged, fragmentary view taken substantially along line 2—2 of FIG. 1.
Figure 3:
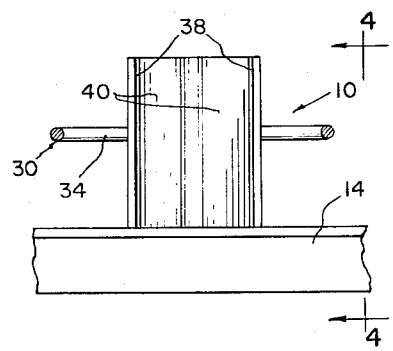
FIG. 3 is an enlarged, vertical sectional view taken along line 3—3 of FIG. 2.

Referring now in detail to the drawings, an article clamp 10 is shown in FIG. 1 with a clamping bracket 12 thereof fixed by suitable means such as, for example, a weld, to a rigid cross bar 14 of a truck or dolly 16 having a frame 18, a handle 20, and wheels 22 supporting a bottom plate 24. The truck 16 is adapted to support two cylindrical articles 26 resting on the bottom plate 24 at opposite sides of the frame 18, and two of the clamps 10 are secured to opposite ends of the cross bar 14, only one clamp and one cylindrical article being shown.

The article clamp 10 includes a looped clamping member 30, which in the specific embodiment shown is a generally circular, somewhat teardrop-shaped wire ring but can be in the form of a generally annular, somewhat teardrop-shaped strap, or to clamp other articles of different forms can have a portion for engaging the particular article and a looped portion. The clamping member shown has portion 32 for engaging the article joined by tangentially extending portions to a loop portion 34 adapted to be slid downwardly along a wedging portion 36 of the bracket 12 to force the article 26 against two spaced, corners 38 of the edges of arms 40 of the bracket. Preferably, for clamping many types of cylindrical articles, the corners 38 are parallel to each other and are sharp so that the article is engaged along two sharp lines and the clamping action of the clamp is, in effect, of the three-point type so that the article is held rigidly and there is no play between the article and the clamp. For other types of articles, a curved shoe for engaging the article is provided on the bracket 12. The wedge portion 36 is rounded in transverse cross-section, and the inclination of the wedge portion relative to the corners 38 is such as to hold the clamping member 30 against accidental loosening while permitting the member to be quickly and easily pushed manually upwardly when desired to release the article and also to be quickly and easily pushed manually downwardly to clamp the article. The bracket 12 preferably is formed from heavy, sheet-like metal in a stamping or forging operation, and is strong and rigid.

Figure 5:
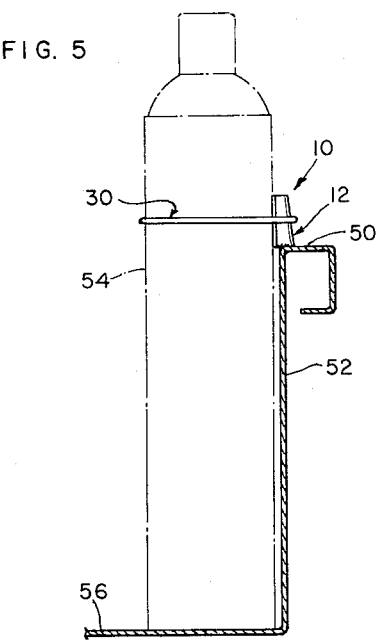
FIG. 5 is a vertical sectional view showing the article clamp of FIG. 1 used to retain an article in a position adjacent a wall.
Figure 4:
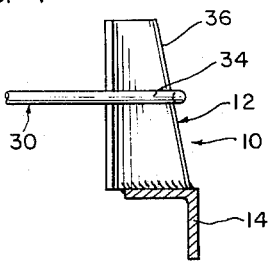
FIG. 4 is an enlarged, vertical sectional view taken along line 4—4 of FIG. 3.

The clamp 10 is adapted to be used for a wide variety of articles and with a wide variety of supports. One such application is shown in FIG. 5 where the clamp 10 is fixed to a plate 50 secured rigidly to a wall 52 with the clamp holding an article 54 rigidly in a position supported by a floor 56 and close to the wall. The clamp is very quickly and easily placed in clamping condition and is quickly and easily moved to a releasing condition.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In an article clamp,
   a wedge member having a pair of article-engaging portions spaced a predetermined distance apart and a wedging portion,
   and a clamping member having a loop portion adapted to be slid along the wedging portion and also being provided with a portion engaging an article substantially greater in transverse dimension than said distance and forcing the article against the article-engaging portions of the wedge member.
2. In an article clamp,
   an angle member having a pair of side members joining angularly at an apex portion,
   the edges of the side members remote from the apex portion being parallel to each other and being spaced a predetermined distance apart,
   the apex portion being inclined relative to the outer edge portions of the side members of the angle member,
   and a clamping member having an article-engaging portion and a looped portion adapted to be slid along the apex portion to force an article substantially greater in transverse dimension than said distance against the outer edge portions of the side members.
3. In an article clamp,
   a bracket having a pair of spaced article-engaging portions and a wedge portion positioned between the article-engaging portions,
   and a clamping member having an article-engaging portion adapted to engage one point of an article and a portion adapted to hook over and slide along the wedge portion to press the article tightly against the pair of spaced article-engaging portions of the bracket and effect a three-point clamping action on the article.

4. In an article clamp,
a bracket including a pair of plate portions extending angularly relative to each other in transverse cross section and joined to each other to form an apex portion,
the outer edges of the plate portions extending substantially parallel to each other and the apex portion extending along and being inclined relative to the outer edges of the plate portion,
and a clamping member having a first portion adapted to be slid along the apex portion and having a second portion for engaging an article and pulling the article tightly against the outer edge portions of the plate portions as the first portion is slid along the apex portion.

5. The article clamp of claim 4 wherein the clamping member comprises a ring adapted to encompass an article and the bracket.

6. In an article clamp,
a support,
an elongated, angular bracket fixed in a vertically extending position to the support at the lower end of the bracket and having a wedge portion extending along one side thereof and a pair of laterally spaced outer edge portions extending along the other side thereof and adapted to engage one side of an article,
and a clamping member having a clamping portion adapted to engage the opposite side of an article engaged by the edge portions and a looped portion adapted to be slid along the wedge portion to a locked position thereon in which the article is pressed tightly between the spaced outer edge portions of the bracket and the clamping portion.

7. The article clamp of claim 6 wherein the bracket is in the form of an elongated angle member including a pair of plate portions joined together to form the wedge portion at the juncture thereof,
the wedge portion being rounded in transverse cross section.

8. The article clamp of claim 7 wherein the outer edge portions of the plate portions are sharp and extend substantially parallel to each other.

References Cited by the Examiner
UNITED STATES PATENTS
| | | | |
|---|---|---|---|
| 1,442,862 | 1/1923 | Curtis | 24—136 |
| 2,679,993 | 6/1954 | Christophersen | 248—27 |

FOREIGN PATENTS
| | | |
|---|---|---|
| 1,836 | 1873 | Great Britain. |
| 124,928 | 4/1919 | Great Britain. |
| 873,292 | 7/1961 | Great Britain. |
| 165,687 | 2/1934 | Switzerland. |

WILLIAM FELDMAN, *Primary Examiner.*

DONLEY J. STOCKING, *Examiner.*

D. GRIFFIN, *Assistant Examiner.*